United States Patent
Kawamoto et al.

(10) Patent No.: US 6,632,274 B2
(45) Date of Patent: Oct. 14, 2003

(54) ULTRAFINE PARTICLE DISPERSION COMPOSITION, COMPOSITION FOR INTERLAYER FOR LAMINATED GLASS, INTERLAYER AND LAMINATED GLASS

(75) Inventors: Yoshimi Kawamoto, Hyogo (JP); Fuminori Osako, Hyogo (JP); Hitoshi Okada, Hyogo (JP); Kuniko Nagai, Kanagawa (JP)

(73) Assignees: Asahi Glass Company, Tokyo (JP); Fuji Titanium Industry Co., Ltd., Osaka (JP)

( * ) Notice: Subject to any disclaimer, the term of this patent is extended or adjusted under 35 U.S.C. 154(b) by 0 days.

(21) Appl. No.: 10/171,595

(22) Filed: Jun. 17, 2002

(65) Prior Publication Data

US 2003/0021994 A1 Jan. 30, 2003

Related U.S. Application Data

(63) Continuation of application No. PCT/JP00/08928, filed on Dec. 15, 2000.

(30) Foreign Application Priority Data

Dec. 17, 1999 (JP) .......................................... 11-359745

(51) Int. Cl.$^7$ .......................... C09D 1/00; C09D 11/06; C03C 27/12

(52) U.S. Cl. ............................... 106/286.4; 106/287.19; 106/429; 106/455; 106/447; 106/499; 106/504; 106/505

(58) Field of Search ........................ 106/286.4, 287.19, 106/499, 504, 505, 429, 455, 447

(56) References Cited

U.S. PATENT DOCUMENTS

| 5,518,810 A | 5/1996 | Nishihara et al. ........... 428/328 |
| 5,830,568 A | * 11/1998 | Kondo ....................... 428/328 |

FOREIGN PATENT DOCUMENTS

| JP | 4-160041 | 6/1992 |
| JP | 5-70178 | 3/1993 |
| JP | 8-259279 | 10/1996 |

* cited by examiner

*Primary Examiner*—D. S. Nakarani
(74) *Attorney, Agent, or Firm*—Oblon, Spivak, McClelland, Maier & Neustadt, P.C.

(57) ABSTRACT

By incorporating and dispersing infrared ray shielding ultrafine particles having an average particle size of from 10 to 60 nm and a volume ratio of ultrafine particles having particle sizes of at least 60 nm being at most 15% of all particles, in a plasticizer, it is possible to obtain an ultrafine particle dispersion composition having the ultrafine particles uniformly dispersed. By using this composition, it is possible to obtain a laminated glass or an interlayer of a laminated glass, which has a small haze value and which is excellent in the infrared ray shielding performance.

19 Claims, No Drawings

ULTRAFINE PARTICLE DISPERSION COMPOSITION, COMPOSITION FOR INTERLAYER FOR LAMINATED GLASS, INTERLAYER AND LAMINATED GLASS

This is a continuation of PCT/JP00/08928, filed Dec. 15, 2000.

TECHNICAL FIELD

The present invention relates to an ultrafine particle dispersion composition containing infrared ray shielding ultrafine particles (hereinafter referred to as "ultrafine particles"), a composition for an interlayer for a laminated glass, an interlayer employing it, and a laminated glass. Particularly, it relates to a fine particle dispersion composition wherein ultrafine particles are uniformly dispersed and whereby it is possible to obtain shaped resin products excellent in transparency and having the ultrafine particles uniformly dispersed, by incorporating it to various shaped resin products. Further, it relates to a composition for an interlayer capable of forming an interlayer which is transparent and excellent in the infrared ray shielding performance and which has a small haze value, when used as an interlayer for a laminated glass, an interlayer employing it, and a laminated glass.

BACKGROUND ART

Tin-doped indium oxide (hereinafter referred to as "ITO"), antimony-doped tin oxide (hereinafter referred to as "ATO") or the like is used for various applications, such as infrared ray reflecting layers for window glasses for vehicles or for window glasses for buildings, or transparent electrodes for e.g. solar cells or for liquid crystal display devices, or transparent conductive layers for electroluminescence displays or for touch panels. A layer made of ITO or ATO is formed by a sputtering method, a vacuum vapor deposition method, a coating method or the like. In recent years, a method of forming a film having ultrafine particles of e.g. ITO or ATO, has attracted an attention. The forming method may be a method of coating a coating material containing the ultrafine particles on a film, or a method of kneading the ultrafine particles into a resin, whereby processing into a complicated shape will be possible. Among window glasses for vehicles or window glasses for buildings, there are some which are required to have functions for heat insulation, infrared ray shielding, etc. Especially, window glasses for vehicles are required to shield solar radiation energy entering into vehicles and thereby to suppress the temperature rise in the vehicles and air conditioning loads. Accordingly, glasses having the infrared ray shielding performance improved by imparting the infrared ray absorbing performance by adjusting the coloring or the composition of the glass itself or by forming an infrared ray reflecting layer made of a transparent thin layer of a metal oxide on the glass surface, are being used for window glasses for vehicles. However, if a thin layer of e.g. a metal oxide is formed on the glass surface, the glass will have electrical conductivity, whereby the radio wave transmittance will be decreased. Accordingly, it is likely that such a proposal is not applicable to various systems operable by radio wave signals, such as keyless entry systems for vehicles or automatic charging systems for future highways.

If functions such as an infrared ray shielding performance and radio wave transmittance, are imparted to an interlayer of a laminated glass to be used as a window glass (a front glass) in front of a driver sheet of a vehicle, such functions are useful as a window glass for a vehicle. Accordingly, JP-A-8-259279 proposes a laminated glass having functional ultrafine particles with particle sizes of at most 0.2 μm dispersed in an interlayer disposed between a pair of transparent glass sheets. With such a laminated glass, radio wave transmittance can be obtained, while shielding infrared rays and ultraviolet rays.

It is common that if fine particles are incorporated in an interlayer of a laminated glass, the haze value increases. Namely, with a laminated glass having ultrafine particles incorporated and dispersed in the interlayer, the haze value tends to be large. Therefore, with the laminated glass disclosed in the above publication, it is proposed to reduce the particle size of the fine particles to prevent increase of the haze value. Specifically, the same publication discloses that ultrafine particles having a particle size of at most 0.2 μm, preferably ultrafine particles having a particle size distribution of from 0.1 to 0.001 μm, more preferably from 0.03 to 0.01 μm, are preferred.

However, if the particle size of ultrafine particles is reduced, the ultrafine particles tend to be susceptible to oxidation. As a result, the infrared ray shielding performance of the ultrafine particles deteriorates. Thus, if the particle size is simply reduced as disclosed in the above publication in order to prevent increase of the haze value, no adequate infrared ray shielding performance can be obtained. As a result, it has been difficult to obtain a laminated glass having a desired infrared ray shielding performance, as well as a haze value where the visibility can be secured.

An object of the present invention is to provide an ultrafine particle dispersion composition which can be incorporated to various shaped resin products, thereby to obtain shaped resin products having ultrafine particles uniformly dispersed and being excellent in transparency.

Another object of the present invention is to provide a composition for an interlayer, whereby ultrafine particles can be uniformly dispersed in an interlayer for a laminated glass, thereby to obtain a laminated glass having small electrical conductivity and being excellent in the infrared ray shielding performance, an interlayer employing such a composition, and a laminated glass.

DISCLOSURE OF THE INVENTION

The present invention provides an ultrafine particle dispersion composition comprising a plasticizer and infrared ray shielding ultrafine particles dispersed in the plasticizer, wherein the average particle size of the infrared ray shielding ultrafine particles is from 10 to 60 nm, and the sum of volumes of infrared ray shielding ultrafine particles having particle sizes of at least 60 nm, is at most 15% of the sum of volumes of all particles. Further, the present invention provides an ultrafine particle dispersion composition comprising a plasticizer and infrared ray shielding ultrafine particles dispersed in the plasticizer, wherein the average particle size of the infrared ray shielding ultrafine particles is from 15 to 30 nm, and the sum of volumes of infrared ray shielding ultrafine particles having particle sizes of at least 40 nm, is at most 10% of the sum of volumes of all particles. These ultrafine particle dispersion compositions will be hereinafter referred to as "a liquid composition of the present invention".

The present invention also provides a composition for an interlayer for a laminated glass (hereinafter referred to as "a film composition of the present invention"), comprising the above-mentioned ultrafine particle dispersion composition.

The present invention provides an interlayer for a laminated glass, having a resin material for an interlayer comprising a main constituting resin for an interlayer for a laminated glass, infrared ray shielding ultrafine particles and a plasticizer, formed into a film form, wherein the average particle size of the infrared ray shielding ultrafine particles is from 10 to 60 nm, and the sum of volumes of infrared ray shielding ultrafine particles having particle sizes of at least 60 nm, is at most 15% of the sum of volumes of all particles. Further, the present invention provides an interlayer for a laminated glass, having a resin material for an interlayer comprising a main constituting resin for an interlayer for a laminated glass, infrared ray shielding ultrafine particles and a plasticizer, formed into a film form, wherein the average particle size of the infrared ray shielding ultrafine particles is from 15 to 30 nm, and the sum of volumes of infrared ray shielding ultrafine particles having particle sizes of at least 40 nm, is at most 10% of the sum of volumes of all particles.

The present invention provides a laminated glass having a plurality of glass sheets laminated via the above interlayer for a laminated glass.

The liquid composition or the film composition of the present invention comprises a plasticizer and ultrafine particles dispersed in the plasticizer. The average particle size of the ultrafine particles is within a range of from 10 to 60 nm, preferably within a range of from 15 to 30 nm. The particle sizes of the ultrafine particles in each composition have a certain particle size distribution, but the sum of volumes of ultrafine particles having particle sizes of at least 60 nm is at most 15%, preferably at most 10%, of the sum of volumes of all ultrafine particles. By suppressing the proportion of ultrafine particles having particle sizes of at most 60 nm in each composition to be small, it is possible to obtain a liquid composition and a film composition, which have small haze values, and it is also possible to obtain a laminated glass and an interlayer for a laminated glass, which have small haze values.

Namely, if it is attempted to suppress the haze value simply by reducing the particle size, there will be a problem of bringing about deterioration of the infrared ray shielding performance. Whereas, according to the present invention, such a problem can be solved by using ultrafine particles having an average particle size of from 10 to 60 nm, wherein the sum of volumes of ultrafine particles having particle size of at least 60 nm is at most 15% of the sum of volumes of all particles. Here, the sum of volumes of ultrafine particles is an amount obtained by totaling all volume values of the respective particles.

To adjust the average particle size to a level of from 15 to 30 nm, is effective to make the particle sizes of ultrafine particles in the liquid composition or in the film composition not too large or not too small. Of course, even if the average particle size is merely adjusted to be from 15 to 30 nm, the haze value may still become large, or the infrared ray shielding performance may still be low. Accordingly, in the present invention, it is designed that ultrafine particles having extremely large particle sizes or ultrafine particles having extremely small particle sizes are not included (i.e. the sum of volumes of ultrafine particles having particle sizes of at least 60 nm is at most 15% of the sum of volumes of all particles).

On the other hand, even if ultrafine particles having extremely large particle sizes or ultrafine particles having extremely small particle sizes, are not included, the haze value may still become large. Therefore, when the average particle size is adjusted to be from 15 to 30 nm, it is effective to adjust the sum of volumes of ultrafine particles having particle sizes of at least 40 nm to be at most 10% of the sum of volumes of all particles, which will be explained. When ultrafine particles are dispersed in a plasticizer, if variation in the particle size of the ultrafine particles is large, uniform dispersion tends to be difficult. If not uniformly dispersed, the ultrafine particles tend to undergo secondary agglomeration in the dispersion. The secondary agglomeration will lead to an increase of the haze value. Accordingly, even if ultrafine particles having extremely large particle sizes or ultrafine particles having extremely small particle sizes are not included, if variation in the particle size is large, the haze value becomes large. Therefore, in order not to let the haze value increase, it is effective to suppress variation in the particle size. In a case where the average particle size is not particularly large (in a case where the average particle size is at most 30 nm) under such conditions that ultrafine particles having extremely large particle sizes or ultrafine particles having extremely small particle sizes, are not included, the following may be said with respect to variation in the particle size. Namely, in a case where the average particle size is not particularly large, the content of ultrafine particles having extremely large particle sizes will naturally be small. Accordingly, in such a case, the following two cases are possible even if there is no substantial difference in the content of ultrafine particles having extremely large particle sizes. Case 1: The content of ultrafine particles having particle sizes slightly larger than the average particle size, is large. Case 2: The content of ultrafine particles having particle sizes slightly larger than the average particle size, is small. Case 1 corresponds to a case where variation is the particle size is large. Case 2 corresponds to a case where variation in the particle size is small. Accordingly, to suppress the secondary agglomeration, it is required that the content of ultrafine particles having particle sizes slightly larger than the average particle size, is small (case 2).

Further, the particle size distribution in the case of case 1 is such a distribution that the peak value in the distribution curve is small, and spreading of the base portion of the distribution curve is small. In other words, such a distribution curve is a curve like a gently sloping low mountain. The particle size distribution in the case of case 2 is a distribution such that the distribution curve will be a curve having a sharp peak.

It is of course possible to suppress secondary agglomeration even if there is variation in the particle size, by employing a special dispersing technique or a special dispersing agent. On the other hand, in a case where no such special dispersing technique or special dispersing agent is taken into consideration, it is required to reduce the content of ultrafine particles having particle sizes slightly larger than the average particle size. Accordingly under a condition such that no special dispersing technique or special dispersing agent is taken into consideration, if the average particle size of the infrared ray shielding ultrafine particles in the liquid composition or the film composition of the present invention is from 15 to 30 nm, the sum of volumes of the infrared ray shielding ultrafine particles having particle sizes of at least 40 nm, is at most 10% of the sum of volumes of all particles. And, by using ultrafine particles which have an average particle size of from 15 to 30 nm and wherein the sum of volumes of particles having particle sizes of at least 40 nm is at most 10% of the sum of volumes of all particles, it is possible to prevent deterioration of the infrared ray shielding performance, while suppressing the haze value by reducing the particle size.

The plasticizer as an essential component of the liquid composition, the film composition or the interlayer of the present invention, is suitably selected depending upon the particular purpose and is not particularly limited. For example, an organic plasticizer such as a monobasic acid ester or a polybasic acid ester; or a plasticizer of a phosphoric acid type such as an organic phosphoric acid type or an organic phosphorous acid type, may be used.

As the monobasic acid ester, the following may, for example, be preferred. A glycol type ester obtained by a reaction of triethylene glycol with an organic acid such as butyric acid, isobutyric acid, caproic acid, 2-ethylbutyric acid, heptanoic acid, n-octylic acid, 2-ethylhexylic acid, pelargonic acid (n-nonylic acid), or decylic acid. As another example, an ester obtained by a reaction of tetraethylene glycol or tripropylene glycol with such an organic acid, may also be used. As the polybasic acid ester, the following may, for example, be mentioned. An ester obtained by a reaction of a $C_{4-8}$ linear or branched alcohol with an organic acid such as adipic acid, sebasic acid or azelaic acid. As the phosphoric type plasticizer, the following may, for example, be mentioned. Tributoxyethyl phosphate, isodecylphenyl phosphate, triisopropyl phosphate, etc.

Among the above plasticizers, the following plasticizers are particularly preferred. Triethylene glycol-di-2-ethylbutyrate, triethylene glycol-2-ethylhexoate, triethylene glycol-di-caprylate, triethylene glycol-di-n-octoate, and others such as dibutyl sebacate, dioctyl azelate and dibutylcarbitol azipate. These plasticizers may be used alone or in combination as a mixture of two or more of them.

As the ultrafine particles in the present invention, ITO fine particles, ATO fine particles, zinc oxide fine particles or titanium nitride fine particles, may, for example, be used. Further, these ultrafine particles may suitably be selected, and if necessary, may be used as mixed, as the case requires. Among them, ITO fine particles are preferred in that the desired infrared ray shielding performance can be obtained with a small amount.

The content ratio of tin to indium in such ITO fine particles is from 1:99 to 20:80, preferably from 4:96 to 15:85, by mass ratio. By adjusting the content ratio within this range, the desired infrared ray shielding performance can be obtained.

The method for producing such ITO ultrafine particles may be any conventional production method and is not particularly limited. For example, the following methods may be mentioned as the method for producing ITO fine particles. A method wherein an aqueous solution of an indium compound or a tin compound is hydrolyzed, and the resulting sol containing colloidal particles is subjected to filtration and washing and then to heat treatment. A method in which indium/tin mixed hydroxide is dispersed in an organic solvent and azeotropically dehydrated, followed by calcination. Further, a method wherein by adjusting the water content in the reaction system to be not more than the amount of an organic solvent, an aqueous alkaline solution is added to a solution of an indium salt and a tin salt, to form a mixture of indium hydroxide and tin hydroxide, followed by heat treatment. Among them, the method is preferred wherein a hydrate of tin oxide and indium oxide obtained by adding an aqueous alkaline solution to a solution of a tin salt and an indium salt, is subjected to heat treatment. In this production method, it is effective to preliminarily carry out pulverization treatment to a predetermined particle size before the heat treatment, whereby the coarse particle can be reduced, and the particle size can be made uniform.

In the liquid composition of the present invention, the ratio of the plasticizer to the ultrafine particles may suitably be determined depending upon the dispersibility of the ultrafine particles, the desired infrared ray shielding performance, or the nature of the material of the ultrafine particles. Particularly when ITO fine particles are used, the ratio of the plasticizer is preferably within a range of from 20 to 2000 parts by mass, more preferably within a range of from 60 to 1000 parts by mass, per 100 parts by mass of the ITO fine particles, from the viewpoint of good dispersibility or from a viewpoint such that ITO fine particles can be uniformly dispersed.

In order to improve the dispersibility of ultrafine particles, it is preferred to add a dispersing agent, as the case requires, to the liquid composition, film composition or interlayer of the present invention. As the dispersing agent, it is preferred to employ a higher fatty acid ester. The higher fatty acid ester may, for example, be a polyglycerol fatty acid ester, a sorbitan fatty acid ester or a sucrose fatty acid ester. Particularly preferred is a polyglycerol fatty acid ester. In addition to a linear polyglycerol condensed at the α-position, the polyglycerol may partially contain a branched polyglycerol condensed at the β-position or a cyclic polyglycerol.

The polyglycerol constituting the polyglycerol fatty acid ester may have a number average polymerization degree of from 2 to 20. Particularly preferably, the number average polymerization degree is from 2 to 10, whereby the dispersibility of ITO fine particles will be good.

The fatty acid may be a branched or linear saturated or unsaturated fatty acid. For example, an aliphatic monocarboxylic acid, such as caproic acid, enanthylic acid, caprylic acid, nonoic acid, capric acid, lauric acid, myristic acid, behenic acid, palmitic acid, isostearic acid, stearic acid, oleic acid, isononic acid or arachic acid, may be mentioned.

In the present invention, as the polyglycerol fatty acid ester to be used as a higher fatty acid ester, one of the following glycerol fatty acid esters, or a mixture of two or more of them, may, for example, be mentioned.

Diglycerol monolaurate, diglycerol monopalmilate, diglycerol monopalmitate, diglycerol monostearate, diglycerol monoolate, diglycerol monooleate, diglycerol monobehenate, diglycerol monocaprylate, diglycerol monocaprate, diglycerol monolinolate, diglycerol monoricinoleate, diglycerol monoadipate, diglycerol monosebacinate, diglycerol dilaurate, diglycerol dipalmilate, diglycerol dipalmitate, diglycerol distearate, diglycerol diolate, diglycerol dioleate, diglycerol dibehenate, diglycerol dicaprylate, diglycerol dicaprate, diglycerol dilinolate, diglycerol diricinolate, diglycerol diadipate, diglycerol disebacinate, triglycerol monolaurate, triglycerol monopalmilate, triglycerol monopalmitate, triglycerol monostearate, triglycerol monoolate, triglycerol monooleate, triglycerol monobehenate, triglycerol monocaprylate, triglycerol monocaprate, triglycerol monolinolate, triglycerol monoricinoleate, triglycerol monoadipate, triglycerol monosebacinate, triglycerol dilaurate, triglycerol dipalmilate, triglycerol palmitate, triglycerol distearate, triglycerol diolate, triglycerol dioleate, triglycerol dibehenate, triglycerol dicaprylate, triglycerol dicaprate, triglycerol dilinolate, triglycerol diricinolate, triglycerol diadipate, triglycerol disebacinate, tetraglycerol monolaurate, tetraglycerol monopalmilate, tetraglycerol monopalmitate, tetraglycerol monostearate, tetraglycerol monoolate, tetraglycerol monooleate, tetraglycerol monobehenate, tetraglycerol monocaprylate, tetraglycerol monocaprate, tetraglycerol monolinolate, tetraglycerol monoricinoleate, tetraglycerol monoadipate, tetraglycerol monosebacinate, tetraglycerol dilaurate, tetraglycerol dipalmilate, tetraglycerol palmitate, tetraglycerol distearate, tetraglycerol diolate, tetraglycerol dioleate, tetraglycerol dibehenate, tetraglycerol dicaprylate, tetraglycerol dicaprate, tetraglycerol dilinolate, tetraglycerol diricinolate, tetraglycerol diadipate, tetraglycerol disebacinate, hexaglycerol monolaurate, hexaglycerol monopalmilate, hexaglycerol monopalmitate, hexaglycerol monostearate, hexaglycerol monoolate, hexaglycerol monooleate, hexaglycerol monobehenate, hexaglycerol monocaprylate, hexaglycerol monocaprate, hexaglycerol monolinolate, hexaglycerol monoricinoleate, hexaglycerol monoadipate, hexaglycerol monosebacinate, hexaglycerol dilaurate, hexaglycerol dipalmilate, hexaglycerol palmitate, hexaglycerol distearate, hexaglycerol diolate, hexaglycerol dioleate, hexaglycerol dibehenate, hexaglycerol dicaprylate, hexaglycerol dicaprate, hexaglycerol dilinolate, hexaglycerol diricinolate, hexaglycerol diadipate, hexaglycerol disebacinate, decaglycerol monolaurate, decaglycerol monopalmilate, decaglycerol monopalmitate, decaglycerol monostearate, decaglycerol monoolate, decaglycerol monooleate, decaglycerol monobehenate, decaglycerol monocaprylate, decaglycerol monocaprate, decaglycerol monolinolate, decaglycerol monoricinoleate, decaglycerol monoadipate, decaglycerol monosebacinate, decaglycerol dilaurate, decaglycerol dipalmilate, decaglycerol palmitate, decaglycerol distearate, decaglycerol diolate, decaglycerol dioleate, decaglycerol dibehenate, decaglycerol dicaprylate, decaglycerol dicaprate, decaglycerol dilinolate, decaglycerol diricinolate, decaglycerol diadipate, decaglycerol disebacinate, polyglycerol monolaurate, polyglycerol monopalmilate, polyglycerol monopalmitate, polyglycerol monostearate, polyglycerol monoolate, polyglycerol monooleate, polyglycerol monobehenate, polyglycerol monocaprylate, polyglycerol monocaprate, polyglycerol monolinolate, polyglycerol monoricinoleate, polyglycerol monoadipate, polyglycerol monosebacinate, polyglycerol dilaurate, polyglycerol dipalmilate, polyglycerol palmitate, polyglycerol distearate, polyglycerol diolate, polyglycerol dioleate, polyglycerol dibehenate, polyglycerol dicaprylate, polyglycerol dicaprate, polyglycerol dilinolate, polyglycerol diricinolate, polyglycerol diadipate, polyglycerol disebacinate, polyglycerol polylaurate, polyglycerol polypalmilate, polyglycerol polypalmitate, polyglycerol polystearate, polyglycerol polyolate, polyglycerol polyoleate, polyglycerol polybehenate, polyglycerol polycaprylate, polyglycerol polycaprate, polyglycerol polylinolate, polyglycerol polyricinolate, polyglycerol polyadipate, polyglycerol polysebacinate, etc. In addition to these, ester bond products of polyglycerol with various saturated fatty acids, unsaturated fatty acids, linear fatty acids or branched fatty acids, may, for example, be mentioned.

Specific examples of the polyglycerol fatty acid ester to be used as a higher fatty acid ester in the present invention, may, for example, be one commercially available under a tradename "AJISPER" from Ajinomono Co., Inc., and one commercially available under a tradename "SY Glyster" from Sakamoto Yakuhin Kogyo Co., Ltd.

Further, as the higher fatty acid ester, an ester of an unsaturated fatty acid having a hydroxyl group, is preferred. As the ester of an unsaturated fatty acid having a hydroxyl group, an ester of an unsaturated fatty acid having a hydroxyl group, with polyglycerol, sorbitan, sucrose or the like, may, for example, be mentioned. As the ester having an unsaturated fatty acid having a hydroxyl group, an ester of polyglycerol, is particularly preferred. The polyglycerol may partially contain a branched polyglycerol condensed at the β-position or a cyclic polyglycerol in addition to a linear polyglycerol condensed at the α-position.

The unsaturated fatty acid having a hydroxyl group, is a chain carboxylic acid having at least one hydroxyl group and at least one double bond or triple bond, in its molecule. The unsaturated fatty acid having a hydroxyl group, may, for example, be recinoleic acid, recinostearoyl acid or recinoelaidic acid.

The ester of polyglycerol to be used as an ester of an unsaturated fatty acid having a hydroxyl group, may, for example, be one of the following glycerol esters or a mixture of two or more of them. Here, these examples are ones already mentioned, but they will be listed as particularly preferred examples. Diglycerol monorecinolate, diglycerol direcinolate, triglycerol monorecinolate, triglycerol direcinolate, tetraglycerol monorecinolate, tetraglycerol direcinolate, hexaglycerol monorecinolate, hexaglycerol direcinolate, decaglycerol monorecinolate, decaglycrol direcinolate, polyglycerol monorecinolate, polyglycerol direcinolate, and polyglycerol polyrecinolate. In addition to these, bonded products of polyglycerol with various unsaturated fatty acids having hydroxyl groups, may, for example, be mentioned.

The liquid composition of the present invention may contain, in addition to the above-described components, an organic solvent or the like, for the purpose of reducing the viscosity at the time of dispersion and to improve the dispersibility. The organic solvent may, for example, be a hydrocarbon type solvent such as toluene, xylene, a high boiling point petroleum hydrocarbon, n-hexane, cyclohexane or n-butane, a halogenated hydrocarbon type solvent such as methylene chloride, chloroform or dichloroethane, an ether type solvent such as dioxane, tetrahydrofuran, butyl ether, butyl ethyl ether or diglyme, a ketone type solvent such as methyl isobutyl ketone, cyclohexanone or isophorone, an ester type solvent such as ethyl acetate, butyl acetate, ethylene glycol monoethyl ether acetate or 2-methoxypropyl acetate, an alcohol type solvent such as methyl alcohol, ethyl alcohol, n-propyl alcohol, isopropyl alcohol, n-butyl alcohol, isobutyl alcohol, t-butyl alcohol, amyl alcohol, n-hexyl alcohol, n-heptyl alcohol, 2-ethylhexyl alcohol, lauryl alcohol, stearyl alcohol, cyclopentanol, cyclohexanol, benzyl alcohol or p-t-butylbenzyl alcohol, an alkylene glycol monoether type solvent such as ethylene glycol monomethyl ether, ethylene glycol monoethyl ether, ethylene glycol monobutyl ether, propylene glycol monomethyl ether, propylene glycol monoethyl ether or propylene glycol monobutyl ether, or an amide type solvent such as dimethylacetamide or dimethylformamide. These organic solvents may suitably be selected depending upon the purpose of the liquid composition or the film composition of the present invention. These organic solvents may be suitably used alone or in combination as a mixture of two or more of them.

The liquid composition of the present invention can be produced by dispersing the ultrafine particles and the plasticizer, and other components which are incorporated as the case requires, such as a dispersant or an organic solvent, by means of a roll mill, a ball mill, a sand grinding mill, a paint shaker, a kneader, a dissolver or an ultrasonic dispersing machine.

The dispersing is suitably adjusted depending upon the type of the ultrafine particles, the blend proportions of the ultrafine particles and the plasticizer, the dispersing apparatus to be used, etc.

By properly adjusting the amount of the plasticizer during its preparation, the liquid composition of the present invention can be made to have such a concentration that it can directly be used for the production of an interlayer for a laminated glass. Otherwise, it can be stored and transported in a concentrated state, so that the user may dilute it with a plasticizer or a solvent to a proper concentration for use.

The liquid composition of the present invention is suitable as a composition for an interlayer useful to form an interlayer for a laminated glass for a vehicle. Namely, the liquid composition of the present invention is capable of forming an interlayer having a small haze value and being transparent and excellent in the infrared ray shielding performance. Further, as it is excellent in dispersibility of ultrafine particles, the liquid composition of the present invention is useful not only as a material for an interlayer for a laminated glass for a vehicle but also for applications to e.g. infrared ray shielding films to be used for window glasses for vehicles or buildings.

The liquid composition of the present invention may be made to be a composition for an interlayer for a laminated glass, by incorporating the main constituting resin for the interlayer and further, if necessary, a plasticizer, other additives, etc.

The main constituting resin of the interlayer may, for example, be a polyvinyl butyral type resin, an ethylene/vinyl acetate copolymer type resin. Other additives may, for example, be an ultraviolet absorber, a photostabilizer, an antioxidant, an adhesion-regulating agent and a colorant.

The ultraviolet absorber may, for example, be of a benzotriazole type such as 2-(2'-hydroxy-5'-methylphenyl)benzotriazole (TINUVIN P, tradename, manufactured by Ciba Geigy), 2-(2'-hydroxy-3',5'-di-t-butylphenyl)benzotriazole (TINUVIN 320, tradename, manufactured by Ciba Geigy), 2-(2'-hydroxy-3'-t-butyl-5'-methylphenyl)-5-chlorobenzotriazole (TINUVIN 326, tradename, manufactured by Ciba Geigy) or 2-(2'-hydroxy-3', 5'-amylphenyl)benzotriazole (TINUVIN 328, tradename, manufactured by Ciba Geigy). The photostabilizer may, for example, be ADEKASTAB LA-57, tradename, manufactured by Asahi Denka Kogyo K.K., as a photostabilizer of a hindered amine type. The antioxidant may, for example, be Sumirizer of BHT, tradename, manufactured by Sumitomo Chemical Co., Ltd. or Irganox 1010, tradename, manufactured by Ciba Geigy, as an antioxidizer of a phenol type. The adhesion-regulating agent may, for example, be a metal salt of a carboxylic acid such as a lithium salt of octylic acid, hexylic acid, butyric acid or formic acid.

By using the main constituting resin for an interlayer and the composition for an interlayer, obtained as described above, it is possible to obtain an interlayer for a laminated glass, which has a small haze value and is transparent and excellent in the infrared ray shielding performance. Namely, an interlayer is obtained by kneading the main constituting resin for an interlayer and, additives added as the case requires, to the composition for an interlayer, followed by forming into a film.

There may be a case wherein from the viewpoint of improvement of the dispersibility, a dispersion composition having ultrafine particles dispersed, is prepared by using a plasticizer in an amount smaller than the amount of the plasticizer required for an interlayer, before preparing the composition for an interlayer. In such a case, to prepare an interlayer, the plasticizer is further added to the dispersion composition and then the interlayer is formed.

The average particle size of ultrafine particles in the interlayer obtained as described above, is within a range of from 10 to 60 nm, preferably from 15 to 30 nm. The particle sizes of ultrafine particles in the interlayer have variation to a certain extent, but the sum of volumes of ultrafine particles having particle sizes of at least 60 nm, is at most 15% of the sum of volumes of all ultrafine particles in the interlayer. Further, with a view to effectively preventing secondary agglomeration, the average particle size of ultrafine particles in the interlayer is from 15 to 30 nm, and the sum of volumes of ultrafine particles having particle sizes of at least 40 nm, is at most 10% of the sum of volumes of all ultrafine particles in the interlayer.

By suppressing the proportion of ultrafine particles having particle sizes of at least 60 nm or the proportion of ultrafine particles having particle sizes of at least 40 nm, in the interlayer, to be small, the haze value of the interlayer, and the resulting laminated glass, can be made small. Namely, in the present invention, by employing ultrafine particles which have an average particle size of from 10 to 60 nm and wherein the sum of volumes of ultrafine particles having particle sizes of at least 60 nm, is at most 15% of the sum of volumes of all particles, it is possible to solve a problem that deterioration of the infrared ray shielding performance will be brought about if it is attempted to suppress the haze value simply by reducing the particle size. Further, in the present invention, by employing ultrafine particles which have an average particle size of from 15 to 30 nm and wherein the sum of volumes of ultrafine particles having particle sizes of at least 40 nm, is at most 10% of the sum of volumes of all particles, it is possible to solve a problem that deterioration of the infrared ray shielding performance will be brought about if it is attempted to suppress the haze value simply by reducing the particle size.

In such a case, it is preferred that the interlayer contains ultrafine particles in an amount of from 0.01 to 1 part by mass per 100 parts by mass of the total mass of the main constituting resin for an interlayer, the ultrafine particles, the plasticizer and additives such as a dispersant (contained in the dispersion) and an adhesion-imparting agent (contained in the interlayer) which are incorporated as the case requires.

By the ultrafine particles having the above-described particle size distribution, and further by using an interlayer prepared by the above-mentioned preferred blend composition, the following effects can be obtained.

Namely, the prepared interlayer is disposed between a plurality of glass sheets, to prepare a laminated glass having a plurality of glass sheets laminated via the interlayer. Thus, it is possible to obtain a laminated glass which is suitable for a window glass for vehicles and which has a small haze value, is excellent in the infrared ray shielding performance and has a radio wave transmitting performance.

In the present invention, the following methods may be mentioned as the methods for measuring the volume proportion of ultrafine particles of at least 60 nm and the volume proportion of ultrafine particles of at least 40 nm. With respect to ultrafine particles in a liquid i.e. ultrafine particles in the liquid composition of the present invention, it is preferred to employ a particle size distribution measuring apparatus by a dynamic scattering type particle size distribution measuring method. In this case, as the particle size distribution measuring apparatus to be used, it is preferred to employ an apparatus for measuring the volume proportion of particles in a liquid based on the volume, whereby the volume proportion to be measured can directly be measured.

Several methods are available as the method for measuring the particle size distribution. They are a method based on the number, a method based on the length (particle size), a method based on the area, and a method based on the mass (based on the volume). The particle size distributions based on the respective standards, measured by the respective methods, can be converted to a particle size distribution based on the volume, by a known conversion method. Accordingly, to measure the volume proportion, a particle size distribution measuring apparatus based on any one of these standards, may be employed. On the other hand, from the above-mentioned reason, it is preferred to employ a particle size distribution measuring apparatus based on the volume.

With respect to the ultrafine particles in the interlayer, it is preferred to obtain the particle sizes and the number of particles, from the TEM image of the interlayer. In such a case, in order to obtain a TEM image by preparing samples by cutting the interlayer into thin specimen, it is preferred to carry out sampling for a plurality of samples.

EXAMPLES

Now, the present invention will be described in detail with reference to Examples of the present invention and Comparative Examples. However, the present invention is by no means restricted to such Examples. The following "Liquid Examples" represent examples of dispersions, and "Film Examples" represent examples of interlayers prepared by using liquid compositions obtained by the respective Liquid Examples.

Liquid Example 1

2000 g of ITO fine particles (Sn:In=1:9), 200 g of a polyglycerol fatty acid ester (AJISPER, manufactured by Ajinomoto Co., Inc.) as a dispersant and 1800 g of a plasticizer, were put into a beads mill ECM-PILOT, manufactured by Shinmaru Enterprises and treated for 7 hours to obtain a dispersion of ITO fine particles.

With respect to this dispersion, the particle size distribution of ITO fine particles in the dispersion was measured by a particle size distribution measuring apparatus (LB-500, manufactured by Horiba Ltd.). The obtained particle size distribution was a particle size distribution based on the volume. Specifically, in accordance with the standard method of use disclosed in the specification of LB-500, data of 100 times with respect to the same dispersion were taken and analyzed. Here, iterative operations of 50 times were carried out, per taking in every data. From this particle size distribution, the average particle size based on the volume was obtained. The results are shown in Table 1.

Liquid Example 2

A dispersion of ITO fine particles was prepared in the same manner as Liquid Example 1 except that ITO fine particles subjected to a more rough pulverization step than Liquid Example 1, was used. Further, in the same manner as Liquid Example 1, the particle size distribution of ITO fine particles in the dispersion was measured. From the obtained particle size distribution, the average particle size based on the volume, was obtained. The results are shown in Table 1.

Film Example 1

3 g of the ITO fine particle dispersion obtained in Liquid Example 1, 500 g of a polyvinyl butyral resin and 197 g of an additional plasticizer, were blended to obtain a resin composition. This resin composition was melt-kneaded and then formed into a film form by a press molding machine to obtain an interlayer for a laminated glass. From a TEM image of this interlayer, the ratio of the sum of volumes of ITO fine particles having particle sizes of at least 60 nm to the sum of volumes of all ITO fine particles in the obtained interlayer, and the ratio (volume ratio (%)) of the sum of volumes of ITO fine particles having particle sizes of at least 40 nm, were obtained. The results are shown in Table 1.

Film Example 2

3 g of the ITO fine particle dispersion obtained in Liquid Example 2, 500 g of a polyvinyl butyral resin and 197 g of an additional plasticizer, were blended to obtain a resin composition. This resin composition was melt-kneaded and then formed into a film form by a press-molding machine, to obtain an interlayer for a laminated glass. In the same manner as in Film Example 1, the ratio of the sum of volumes of ITO fine particles having particle sizes of at least 60 nm, to the sum of volumes of all ITO fine particles, and the ratio (volume ratio (%)) of the sum of volumes of ITO fine particles having particle sizes of at least 40 nm, were obtained. The results are shown in Table 1.

Further, the interlayer obtained in each Film Example, was interposed between a pair of glass sheets having a thickness of 2 mm, then subjected to preliminary bonding and then to the main press bonding in an autoclave, to obtain a laminated glass in each Example.

Evaluation

With respect to the ITO fine particle dispersion obtained in each Liquid Example, the haze value was measured. Further, with respect to the laminated glass employing the interlayer obtained in each Film Example, the haze value and the total light transmittance were measured. The results are shown in Table 1. The haze value was measured by a haze meter. Here, the haze value of the dispersion was evaluated with respect to one having the dispersion interposed between a pair of glass sheets so that the thickness of the liquid would be about 0.1 mm. The concentration of ITO fine particles in the dispersion in such a case, was 10% as represented by mass percentage.

TABLE 1

| | Liquid Example 1/ Film Example 1 | Liquid Example 2/ Film Example 2 |
|---|---|---|
| Average particle size in the dispersion (nm) | 21 | 27 |
| Volume ratio (%) of ITO fine particles of at least 60 nm in the dispersion | 1.6 | 17.1 |
| Volume ratio (%) of ITO fine particles of at least 40 nm in the dispersion | 8.6 | 26.0 |
| Haze value (%) of the dispersion | 0.9 | 3.8 |
| Average particle size (nm) in the interlayer | 26 | 39 |
| Total mass (g) of the interlayer | 700 | 700 |
| Total mass (g) of ITO fine particles in the interlayer | 1.5 | 1.5 |
| Volume ratio (%) of ITO fine particles of at least 60 nm in the interlayer | 2.0 | 19.0 |
| Volume ratio (%) of ITO fine particles of at least 40 nm in the interlayer | 8.0 | 25.2 |
| Haze value (%) of a laminated glass | 0.3 | 2.1 |
| Total light transmittance (%) of a laminated glass | 63 | 63 |

Industrial Applicability

According to the present invention, by adjusting the average particle size of ultrafine particles to be incorporated and dispersed in the liquid composition, the film composition and the interlayer to be within a range of from 10 to 60 nm and adjusting the sum of volumes of ultrafine particles having particle sizes of at least 60 nm to be at most 15% of the sum of volumes of all fine particles, it is possible to reduce the haze value of the liquid composition, the interlayer and the resulting laminated glass. And, a problem of deterioration of the infrared ray shielding performance by suppressing the haze value simply by reducing the particle size, can be solved by adjusting the average particle size of ultrafine particles to be from 10 to 60 nm and adjusting the sum of volumes of ultrafine particles having particle sizes of at least 60 nm to be at most 15% of the sum of volumes of all ultrafine particles. As a result, it is possible to obtain a laminated glass having the desired infrared ray shielding performance imparted, while suppressing the haze value so that the visibility can be secured.

Further, according to the present invention, by adjusting the average particle size of ultrafine particles to be incorporated and dispersed in the liquid composition, the film composition and the interlayer to be within a range of from 15 to 30 nm and adjusting the sum of volumes of ultrafine particles having particle sizes of at least 40 nm to be at most 10% of the sum of volumes of all fine particles, it is possible to reduce the haze value of the liquid composition, the interlayer and the resulting laminated glass. And, a problem of deterioration of the infrared ray shielding performance by suppressing the haze value simply by reducing the particle size, can be solved by adjusting the average particle size of ultrafine particles to be from 15 to 30 nm, while adjusting the sum of particles of ultrafine particles having particle sizes of at least 40 nm to be at most 10% of the sum of volumes of all ultrafine particles. As a result, it is possible to obtain a laminated glass having the desired infrared ray shielding performance imparted, while suppressing the haze value so that the visibility can be secured.

The entire disclosure of Japanese Patent Application No. 11-359745 filed on Dec. 17, 1999 including specification, claims and summary are incorporated herein by reference in its entirety.

What is claimed is:

1. An ultrafine particle dispersion composition, comprising:
   a plasticizer; and
   infrared ray shielding ultrafine particles dispersed in the plasticizer,
   wherein the average particle size of the infrared ray shielding ultrafine particles is from 10 to 60 nm,
   and wherein the sum of volumes of infrared ray shielding ultrafine particles having particle sizes of 60 nm or more ranges from 1.6 to 15% of the sum of volumes of all of said infrared ray shielding ultrafine particles.

2. The ultrafine particle dispersion composition according to claim 1, wherein the infrared ultrafine particles are tin-doped indium oxide fine particles.

3. The composition according to claim 1, wherein the plasticizer is selected from the group consisting of a monobasic acid ester, a polybasic acid ester, an organic phosphoric acid, and an organic phosphorous acid.

4. The composition according to claim 1, wherein the particles are selected from the group consisting of ITO particles, ATO particles, zinc oxide particles, titanium nitride particles, and mixtures thereof.

5. The composition according to claim 1, wherein the particles are ITO particles having a tin: indium mass ratio ranging from 1:99 to 20:80.

6. The composition according to claim 1, wherein the particles are ITO particles having a tin: indium mass ratio ranging from 4:96 to 15:85.

7. The composition according to claim 1, wherein the particles are ITO particles, and wherein a plasticizer: ITO particle mass ratio ranges from 20 to 2,000 parts plasticizer by mass per 100 parts ITO particles by mass.

8. The composition according to claim 1, further comprising a dispersing agent.

9. The composition according to claim 1, further comprising one or more organic solvents.

10. The composition according to claim 1, wherein the sum of volumes of infrared ray shielding ultrafine particles having particle sizes of 40 nm or more ranges from 8.6 to 10% of the sum of volumes of all of said infrared ray shielding ultrafine particles.

11. An ultrafine particle dispersion compositions comprising:
    a plasticizer; and
    infrared ray shielding ultrafine particles dispersed in the plasticizer,
    wherein the average particle size of the infrared ray shielding ultrafine particles is from 15 to 30 nm,
    and wherein the sum of volumes of infrared ray shielding ultrafine particles having particle sizes of 40 nm or more ranges from 8.6 to 10% of the sum of volumes of all of said infrared ray shielding ultrafine particles.

12. The ultrafine particle dispersion composition according to claim 11, wherein the infrared ultrafine particles are tin-doped indium oxide fine particles.

13. The composition according to claim 11, wherein the plasticizer is selected from the group consisting of a monobasic acid ester, a polybasic acid ester, an organic phosphoric acid, and an organic phosphorous acid.

14. The composition according to claim 11, wherein the particles are selected from the group consisting of ITO particles, ATO particles, zinc oxide particles, titanium nitride particles, and mixtures thereof.

15. The composition according to claim 11, wherein the particles are ITO particles having a tin: indium mass ratio ranging from 1:99 to 20:80.

16. The composition according to claim 11, wherein the particles are ITO particles having a tin: indium mass ratio ranging from 4:96 to 15:85.

17. The composition according to claim 11, wherein the particles are ITO particles, and wherein a plasticizer: ITO particle mass ratio ranges from 20 to 2,000 parts plasticizer by mass per 100 parts ITO particles by mass.

18. The composition according to claim 11, further comprising a dispersing agent.

19. The composition according to claim 11, further comprising one or more organic solvents.

* * * * *

UNITED STATES PATENT AND TRADEMARK OFFICE
CERTIFICATE OF CORRECTION

PATENT NO. : 6,632,274 B2
DATED : October 14, 2003
INVENTOR(S) : Kawamoto et al.

It is certified that error appears in the above-identified patent and that said Letters Patent is hereby corrected as shown below:

Title page,
Item [73], Assignees, should read:
-- [73]  Assignees:  Asahi Glass Company, Limited, Tokyo (JP);
  Fuji Titanium Industry Co., Ltd., Osaka (JP) --

Signed and Sealed this

Twentieth Day of January, 2004

JON W. DUDAS
*Acting Director of the United States Patent and Trademark Office*